US009130458B2

(12) United States Patent
Crookes et al.

(10) Patent No.: US 9,130,458 B2
(45) Date of Patent: *Sep. 8, 2015

(54) STATIC VAR COMPENSATOR WITH MULTILEVEL CONVERTER

(75) Inventors: William Crookes, Salt (GB); David Reginald Trainer, Alvaston (GB); Donald Colin Murray Oates, Brocton (GB)

(73) Assignee: ALSTOM TECHNOLOGY LTD., Baden (CH)

( * ) Notice: Subject to any disclaimer, the term of this patent is extended or adjusted under 35 U.S.C. 154(b) by 204 days.

This patent is subject to a terminal disclaimer.

(21) Appl. No.: 13/634,205

(22) PCT Filed: Mar. 15, 2010

(86) PCT No.: PCT/EP2010/053290
§ 371 (c)(1),
(2), (4) Date: Sep. 13, 2012

(87) PCT Pub. No.: WO2011/113471
PCT Pub. Date: Sep. 22, 2011

(65) Prior Publication Data
US 2013/0094264 A1 Apr. 18, 2013

(51) Int. Cl.
G05F 1/70 (2006.01)
G05F 5/00 (2006.01)
(Continued)

(52) U.S. Cl.
CPC ............. *H02M 7/217* (2013.01); *H02J 3/1835* (2013.01); *H02J 3/1857* (2013.01); *H02M 7/49* (2013.01);
(Continued)

(58) Field of Classification Search
CPC ......... H02J 3/18; H02J 3/1807; H02J 3/1814; H02J 3/1821; H02J 3/1828; H02J 3/1842; H02J 3/185; H02J 3/1864; H02J 3/1871; H02J 3/1878; H02J 3/1885; H02J 3/1892; H02J 3/1835; H02J 3/1857; H02M 7/217; H02M 7/2173; H02M 7/2176; H02M 7/219; H02M 7/23; H02M 7/48; H02M 7/483; H02M 7/487; H02M 7/497; H02M 7/501; H02M 2007/217; H02M 2007/219; H02M 2007/2195; H02M 2007/4835; H02M 2007/483; Y02E 40/12; Y02E 40/14; Y02E 40/16; Y02E 40/18; Y02E 40/26; Y02E 40/30; G05F 1/70

USPC .................. 363/15–17, 21.02, 21.03, 35–38, 363/40–46, 71, 123–128, 131, 132, 363/135–137; 323/205–211, 271–275, 323/282–285, 351; 318/107, 108
See application file for complete search history.

(56) References Cited

U.S. PATENT DOCUMENTS 3,857,083 A 12/1974 Lundstrom
3,867,643 A 2/1975 Baker et al.
(Continued)

FOREIGN PATENT DOCUMENTS

CN 101 795 072 A 8/2010
DE 43 17 965 A1 12/1994
(Continued)

OTHER PUBLICATIONS

Hagiwara, Makoto, "PWM Control and Experiment of Modular Multilevel Converters", Power Electronics Specialists Conference, IEEE, Piscataway, NJ, USA, pp. 154-161 (Jun. 15, 2008).
(Continued)

*Primary Examiner* — Timothy J Dole
*Assistant Examiner* — Carlos Rivera-Perez
(74) *Attorney, Agent, or Firm* — Nixon Peabody LLP

(57) ABSTRACT

A static synchronous compensator for use in reactive power compensation, the static synchronous compensator comprising at least one primary compensator limb including first and second DC terminals, and an AC terminal for connection in use to an AC network, the or each primary compensator limb defining first and second limb portions, each limb portion—including at least one switching element connected in series with a chain-link converter—between a respective one of the first and second DC terminals and the AC terminal, the switching elements of the first and second limb portions being operable to switch the respective chain-link converters in and out of circuit between the respective DC terminal and the AC terminal and the chain-link converters being operable to generate a voltage waveform at the AC terminal; and a secondary compensator limb including at least one DC link capacitor connected between the first and second DC terminals, the secondary compensator limb being connected in parallel with the or each primary compensator limb.

16 Claims, 8 Drawing Sheets

(51) Int. Cl.
   *H02M 7/217*  (2006.01)
   *H02J 3/18*   (2006.01)
   *H02M 7/49*   (2007.01)
   *H02M 7/483*  (2007.01)

(52) U.S. Cl.
   CPC ........ *H02M 2007/4835* (2013.01); *Y02E 40/12* (2013.01); *Y02E 40/16* (2013.01); *Y02E 40/26* (2013.01); *Y02E 40/30* (2013.01)

(56) References Cited

U.S. PATENT DOCUMENTS

| | | | |
|---|---|---|---|
| 4,053,820 A | 10/1977 | Peterson et al. | |
| 4,636,907 A | 1/1987 | Howell | |
| 4,663,702 A | 5/1987 | Tanaka | |
| 4,816,736 A | 3/1989 | Dougherty et al. | |
| 5,093,583 A | 3/1992 | Mashino et al. | |
| 5,164,872 A | 11/1992 | Howell | |
| 5,339,210 A | 8/1994 | Howell | |
| 5,345,375 A | 9/1994 | Mohan | |
| 5,499,178 A | 3/1996 | Mohan | |
| 5,515,264 A | 5/1996 | Stacey | |
| 5,532,575 A | 7/1996 | Ainsworth | |
| 5,644,482 A | 7/1997 | Asplund | |
| 5,673,189 A | 9/1997 | Schettler | |
| 5,719,486 A | 2/1998 | Taniguchi et al. | |
| 5,726,557 A | 3/1998 | Umeda et al. | |
| 5,870,293 A | 2/1999 | Svensson et al. | |
| 5,889,667 A | 3/1999 | Bernet | |
| 5,892,677 A | 4/1999 | Chang | |
| 5,936,855 A | 8/1999 | Salmon | |
| 5,999,422 A | 12/1999 | Goransson et al. | |
| 6,134,126 A | 10/2000 | Ikekame et al. | |
| 6,236,580 B1 | 5/2001 | Aiello et al. | |
| 6,301,130 B1 | 10/2001 | Aiello et al. | |
| 6,320,767 B1 | 11/2001 | Shimoura et al. | |
| 6,392,348 B1 | 5/2002 | Dougherty | |
| 6,603,675 B1 | 8/2003 | Norrga | |
| 6,879,062 B2 | 4/2005 | Oates | |
| 6,987,680 B2 | 1/2006 | Vire et al. | |
| 7,170,767 B2 | 1/2007 | Bixel | |
| 7,199,535 B2 | 4/2007 | Welchko et al. | |
| 7,274,576 B1 | 9/2007 | Zargari et al. | |
| 7,292,462 B2 | 11/2007 | Watanabe et al. | |
| 7,298,115 B2 | 11/2007 | Nishimura et al. | |
| 7,499,291 B2 | 3/2009 | Han | |
| 7,622,825 B2 | 11/2009 | Brune et al. | |
| 8,188,720 B2 | 5/2012 | Kim et al. | |
| 8,294,408 B2 | 10/2012 | Matt et al. | |
| 8,390,259 B2 | 3/2013 | Dommaschk et al. | |
| 8,599,591 B2 | 12/2013 | Crookes et al. | |
| 8,854,843 B2 | 10/2014 | Trainer et al. | |
| 8,861,231 B2 | 10/2014 | Cross et al. | |
| 8,861,234 B2 | 10/2014 | Trainer et al. | |
| 8,867,242 B2 | 10/2014 | Clare et al. | |
| 8,867,244 B2 | 10/2014 | Trainer et al. | |
| 8,934,268 B2 | 1/2015 | Trainer et al. | |
| 9,065,299 B2 | 6/2015 | Trainer et al. | |
| 2002/0060497 A1 | 5/2002 | Arita et al. | |
| 2002/0176265 A1 | 11/2002 | Oates | |
| 2003/0202367 A1 | 11/2003 | Schreiber | |
| 2004/0218318 A1 | 11/2004 | Bijlenga et al. | |
| 2005/0127853 A1 | 6/2005 | Su | |
| 2005/0135126 A1 | 6/2005 | Gazel et al. | |
| 2005/0146226 A1 | 7/2005 | Trainer et al. | |
| 2008/0002443 A1 | 1/2008 | Ueda et al. | |
| 2008/0007978 A1 | 1/2008 | Han | |
| 2008/0179951 A1 | 7/2008 | Brune et al. | |
| 2008/0205093 A1 | 8/2008 | Davies et al. | |
| 2008/0258661 A1 | 10/2008 | Nagashima et al. | |
| 2008/0310205 A1 | 12/2008 | Hiller | |
| 2009/0027934 A1 | 1/2009 | Bustos | |
| 2009/0033254 A1 | 2/2009 | Nagashima et al. | |
| 2009/0085548 A1 | 4/2009 | Suh et al. | |
| 2009/0102436 A1 | 4/2009 | Valderrama et al. | |
| 2009/0116268 A1 | 5/2009 | Kishida et al. | |
| 2009/0206781 A1 | 8/2009 | Itoh et al. | |
| 2010/0067266 A1 | 3/2010 | Dommaschk et al. | |
| 2010/0118578 A1 | 5/2010 | Dommaschk et al. | |
| 2010/0309698 A1 | 12/2010 | Asplund et al. | |
| 2011/0018481 A1 | 1/2011 | Hiller | |
| 2011/0205768 A1 | 8/2011 | Svensson | |
| 2011/0260701 A1 | 10/2011 | Horger et al. | |
| 2011/0280049 A1 | 11/2011 | Mori et al. | |
| 2012/0026767 A1 | 2/2012 | Inoue et al. | |
| 2012/0063185 A1 | 3/2012 | Janning | |
| 2012/0069610 A1 | 3/2012 | Trainer | |
| 2012/0113699 A1 | 5/2012 | Crookes | |
| 2012/0120697 A1 | 5/2012 | Cuk | |
| 2012/0127766 A1 | 5/2012 | Crookes | |
| 2012/0170338 A1 | 7/2012 | Trainer | |
| 2012/0182771 A1 | 7/2012 | Trainer | |
| 2012/0188803 A1 | 7/2012 | Trainer | |
| 2012/0195084 A1 | 8/2012 | Norrga | |
| 2013/0026841 A1 | 1/2013 | Hosini et al. | |
| 2013/0051105 A1 | 2/2013 | Wang et al. | |
| 2013/0099572 A1 | 4/2013 | Norrga | |
| 2013/0119970 A1 | 5/2013 | Trainer et al. | |
| 2013/0128629 A1 | 5/2013 | Clare et al. | |
| 2013/0128636 A1 | 5/2013 | Trainer et al. | |
| 2013/0182467 A1 | 7/2013 | Cross et al. | |
| 2013/0194838 A1 | 8/2013 | Jang et al. | |
| 2013/0208514 A1 | 8/2013 | Trainer et al. | |
| 2013/0208521 A1 | 8/2013 | Trainer et al. | |
| 2013/0279211 A1 | 10/2013 | Green et al. | |
| 2014/0098575 A1 | 4/2014 | Whitehouse | |
| 2014/0133196 A1 | 5/2014 | Trainer et al. | |
| 2014/0146583 A1 | 5/2014 | Trainer et al. | |
| 2014/0254205 A1 | 9/2014 | Trainer et al. | |
| 2014/0293656 A1 | 10/2014 | Trainer et al. | |
| 2014/0293668 A1 | 10/2014 | Trainer et al. | |
| 2014/0313797 A1 | 10/2014 | Davidson et al. | |
| 2015/0009594 A1 | 1/2015 | Okaeme et al. | |
| 2015/0116881 A1 | 4/2015 | Burnett et al. | |
| 2015/0131189 A1 | 5/2015 | Davidson et al. | |

FOREIGN PATENT DOCUMENTS

| | | |
|---|---|---|
| DE | 195 35 552 | 4/1996 |
| DE | 101 03 031 | 7/2002 |
| DE | 10 2005 040 432 A1 | 3/2007 |
| DE | 10 2007 003172 A1 | 2/2008 |
| DE | 10 2008 045247 A1 | 3/2008 |
| DE | 10 2008 014 898 A1 | 9/2009 |
| DE | 10 2010 007 452 A1 | 8/2011 |
| EP | 0 867 998 B1 | 3/2007 |
| EP | 1 800 391 | 6/2007 |
| GB | 2 294 821 | 5/1996 |
| GB | 2 375 902 A | 11/2002 |
| GB | 2 418 079 | 3/2006 |
| JP | 2008-125310 A | 5/2008 |
| WO | 97/02639 | 1/1997 |
| WO | 02/50972 A1 | 6/2002 |
| WO | 02/063758 | 8/2002 |
| WO | 03/055048 | 7/2003 |
| WO | 2007/023061 A2 | 3/2007 |
| WO | 2007/028349 | 3/2007 |
| WO | 2007/028350 | 3/2007 |
| WO | 2007/033852 A1 | 3/2007 |
| WO | 2008/024038 A1 | 2/2008 |
| WO | 2008086760 A1 | 7/2008 |
| WO | 2009/149743 | 12/2009 |
| WO | 2010/025758 | 3/2010 |
| WO | 2010/040388 A1 | 4/2010 |
| WO | 2010/069371 | 6/2010 |
| WO | 2010/088969 | 8/2010 |
| WO | 2010/112523 A1 | 10/2010 |
| WO | 2010/145689 | 12/2010 |
| WO | 2010/149200 | 12/2010 |
| WO | 2010145688 | 12/2010 |
| WO | 2010145690 A1 | 12/2010 |
| WO | 2011/012171 | 2/2011 |
| WO | 2011/012174 | 2/2011 |
| WO | 2011/015227 A1 | 2/2011 |

(56) References Cited

FOREIGN PATENT DOCUMENTS

| WO | 2011/029480 A1 | 3/2011 |
|---|---|---|
| WO | 2011/044928 A1 | 4/2011 |
| WO | 2011050847 A1 | 5/2011 |
| WO | 2011/098117 | 8/2011 |
| WO | 2011/113471 A1 | 9/2011 |
| WO | 2011/124258 | 10/2011 |
| WO | 2011/127980 | 10/2011 |
| WO | 2011/141054 A1 | 11/2011 |
| WO | 2011/157300 | 12/2011 |
| WO | 2012/013248 | 2/2012 |
| WO | 2012/025142 | 3/2012 |
| WO | 2012/167826 | 12/2012 |
| WO | 2013/000510 | 1/2013 |
| WO | 2013/071975 A1 | 5/2013 |
| WO | 2013/017160 A1 | 7/2013 |
| WO | 2013/017177 A1 | 7/2013 |
| WO | 2013/127461 A1 | 9/2013 |
| WO | 2013/127462 A1 | 9/2013 |
| WO | 2013/127463 A1 | 9/2013 |

OTHER PUBLICATIONS

International Search Report and Written Opinion of the International Searching Authority, PCT/EP2010/053290, dated Feb. 11, 2011.
Notice of Allowance in U.S. Appl. No. 13/576,920, mailed on Jun. 9, 2014.
PCT International Search Report and Written Opinion in International Application No. PCT/EP10/62316, mailed on Jul. 6, 2011.
PCT International Search Report in International Application No. PCT/EP2011/070402, mailed on Sep. 27, 2012.
PCT International Preliminary Report on Patentability in International Application No. PCT/EP2011/070402, mailed on Feb. 18, 2014.
First Chinese Office Action in Application No. 2009801607004, mailed Jun. 25, 2014.
Notice of Allowance in U.S. Appl. No. 13/378,336, mailed on Jun. 13, 2014.
Office Action in U.S. Appl. No. 13/388,277, mailed on Jul. 3, 2014.
Notice of Allowance in U.S. Appl. No. 13/640,468, mailed on Jun. 4, 2014.
Notice of Allowance in U.S. Appl. No. 13/813,414, mailed on Jun. 2, 2014.
Notice of Allowance in U.S. Appl. No. 13/818,654, mailed on May 30, 2014.
U.S. Appl. No. 14/357,908, filed May 13, 2014.
Allebrod, S. et al., "New Transformerless, Scalable Modular Multilevel Converters for HVDC—Transmission", Power Electronics Specialists Conference, IEEE, Jun. 15, 2008, pp. 174-179.
Baran M. E. et al., "Overcurrent Protection in DC Zonal Shipboard Power Systems uisng Solid State Protection Devices", Electric Ship Technologies Symposium, 2007. ESTS '07. IEEE, IEEE, PI, May 1, 2007, pp. 221-224.
Glinka M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.
Guanjun Ding et al., "New Technologies of Voltage Source Converter (VSC) for HVDC Transmission System Based on VSC", Power and Energy Society General Meeting—Conversion and Delivery of Electrical Energy in the 21ST Century, 2008 IEEE, IEEE, Piscataway, NJ, USA, Jul. 20, 2008, p. 1-8.
Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.
Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.
Lesnicar, A. et al., "A New Modular Voltage Source Inverter Topology", pp. 1-10, (2003), XP002454302.
Lesnicar, A. et al., "An Innovative Modular Multilevel Converter Topology Suitable for a Wide Power Range", 2003 IEEE Bologna PowerTech Conference, Jun. 23-26, 2003, pp. 1-6.
Liu, Y.H. et al., "A New Statcom Configuration Using Multi-Level DC Voltage Reinjection for High Power Application", IEEE Transactions on Power Delivery, vol. 19, No. 4, Oct. 2004, New Zealand, pp. 1828-1834.
Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.
Qahraman, B. et al., "A VSC Based Series Hybrid Converter for HVDC Transmission", IIEE 0-7803-8886-0/05 CCECE/CCGEI, Saskatoon, May 2005, pp. 458-461.
Raju, N. Ravisekhar, "A DC Link-Modulated Three-Phase Converter", Silicon Power Corp., IEEE, 0-7803-7116-X/01, 2001, pp. 2181-2185.
Su, Gui-Jia et al., "Multilevel DC Link Inverter for Brushless Permanent Magnet Motors with Very Low Inductance", Prepared by Oak Ridge National Laboratory for U.S. Dept. of Energy, 2001, IEEE 0-7803-7116-X/01, pp. 829-834.
Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.
Zhang, W. et al., "Active DC Filter for HVDC Systems", IEEE Computer Applications in Power, vol. 7, No. 1, Jan. 1994, New York, USA, pp. 40-44.
PCT International Search Report and Written Opinion for Application No. PCT/EP2009/057388, mailed on Mar. 18, 2010.
PCT International Preliminary Report on Patentability in International Application No. PCT/EP2009/057388, mailed on Dec. 14, 2011.
PCT International Search Report and Written Opinion in International Application No. PCT/EP2009/057736, mailed on Mar. 26, 2010.
PCT International Preliminary Report on Patentability in International Application No. PCT/EP2009/057736, mailed on Nov. 24, 2011.
PCT International Search Report and Written Opinion in International Application No. PCT/EP2009/059973, mailed on Aug. 13, 2010.
PCT International Preliminary Report on Patentability in International Application No. PCT/EP2009/059973, mailed on Oct. 5, 2011.
PCT International Search Report and Written Opinion in International Application No. PCT/EP2010/051572, mailed on Jan. 19, 2011.
PCT International Preliminary Report on Patentability in International Application No. PCT/EP2010/051572, mailed on Apr. 20, 2012.
PCT International Preliminary Report on Patentability in International Application No. PCT/EP2010/053290, mailed on Apr. 20, 2012.
PCT International Search Report and Written Opinion in International Application No. PCT/EP2010/054660, mailed on Feb. 24, 2011.
PCT International Preliminary Report on Patentability in International Application No. PCT/EP2010/054660, mailed on Jun. 6, 2012.
PCT International Search Report for International Application No. PCT/EP2010/054974, mailed on Mar. 4, 2011.
PCT International Preliminary Report on Patentability in International Application No. PCT/EP2010/054974, mailed on Aug. 10, 2012.
PCT International Search Report and Written Opinion in International Application No. PCT/EP2010/058630, mailed on Apr. 19, 2011.
PCT International Preliminary Report on Patentability in International Application No. PCT/EP2010/058630, mailed on Dec. 19, 2012.
PCT International Search Report and Written Opinion for Application No. PCT/EP2010/061145, mailed on Jun. 5, 2011.
PCT International Preliminary Report on Patentability in International Application No. PCT/EP2010/061145, mailed on Aug. 20, 2012.

(56) References Cited

OTHER PUBLICATIONS

PCT International Search Report and Written Opinion in International Application No. PCT/EP2011/059514, mailed on Jul. 5, 2012.
PCT International Preliminary Report on Patentability in International Application No. PCT/EP2011/059514, mailed on Aug. 1, 2013.
PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
Office Action in U.S. Appl. No. 13/388,277, mailed on Nov. 22, 2013.
Notice of Allowance in U.S. Appl. No. 13/378,336, mailed on Feb. 6, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Notice of Allowance in U.S. Appl. No. 13/576,920, mailed on Dec. 4, 2013.
Notice of Allowance in U.S. Appl. No. 13/576,920, mailed on Mar. 20, 2014.
U.S. Appl. No. 14/129,923, filed Dec. 27, 2013.
Davidson, C.C et al., "Innovative Concepts for Hybrid Multi-Level Converters for HVDC Power Transmission", 9th IET International Conference on AC and DC Power Transmission, ACDC 2010, Oct. 19-21, 2010, 5 pages.
Ertl, H et al., "A Constant Output Current Three-Phase Diode Bridge Rectifier Employing a Novel Electronic Smoothing Inductor", IEEE Transactions on Industrial Electronics, vol. 52, Issue 2, Apr. 1, 2005, pp. 454-461.
Flourentzou, Nikolas et al., "VSC-Based HVDC Power Transmission Systems: An Overview", IEEE Transactions on Power Electronics, vol. 24, No. 3, Mar. 2009, pp. 592-602.
Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.
Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.
PCT International Preliminary Report on Patentability in International Application No. PCT/EP10/62316, mailed on Mar. 7, 2013.
PCT International Search Report and Written Opinion in International Application No. PCT/EP2011/063207, mailed May 30, 2012.
PCT International Preliminary Report on Patentability in International Application No. PCT/EP2011/063207, mailed on Apr. 2, 2014.
PCT International Search Report and Written Opinion in International Application No. PCT/EP2011/064545, mailed Jun. 11, 2012.
PCT International Preliminary Report on Patentability in International Application No. PCT/EP2011/064545, mailed May 19, 2014.
PCT International Search Report and Written Opinion in International Application No. PCT/EP2012/053571, mailed on Jun. 20, 2012.
PCT International Preliminary Report on Patentability in International Application No. PCT/EP2012/053571, mailed on Sep. 12, 2014.
PCT International Search Report and Written Opinion in International Application No. PCT/EP2012/053574, mailed on Nov. 20, 2012.
PCT International Preliminary Report on Patentability in International Application No. PCT/EP2012/053574, mailed on Jul. 21, 2014.
PCT International Search Report and Written Opinion in International Application No. PCT/EP2012/053573, mailed on Dec. 4, 2012.
PCT International Preliminary Report on Patentability in International Application No. PCT/EP2012/053573, mailed on Jul. 21, 2014.
Office Action in U.S. Appl. No. 13/634,205, mailed on Sep. 22, 2014.
Office Action in U.S. Appl. No. 13/639,844, mailed on May 22, 2014.
Notice of Allowance in U.S. Appl. No. 13/639,844, mailed on Sep. 8, 2014.
Notice of Allowance in U.S. Appl. No. 13/805,333, mailed on Feb. 2, 2015.
U.S. Appl. No. 14/379,746, filed Aug. 28, 2014.
U.S. Appl. No. 14/381,570, filed Aug. 27, 2014.
Office Action in U.S. Appl. No. 14/129,923, mailed on Feb. 17, 2015.
Office Action in U.S. Appl. No. 14/359,088, mailed on Apr. 7, 2015.
Office Action in U.S. Appl. No. 13/388,277, mailed on Mar. 18, 2015.
Notice of Allowance in U.S. Appl. No. 14/356,882, mailed on Jul. 20, 2015.

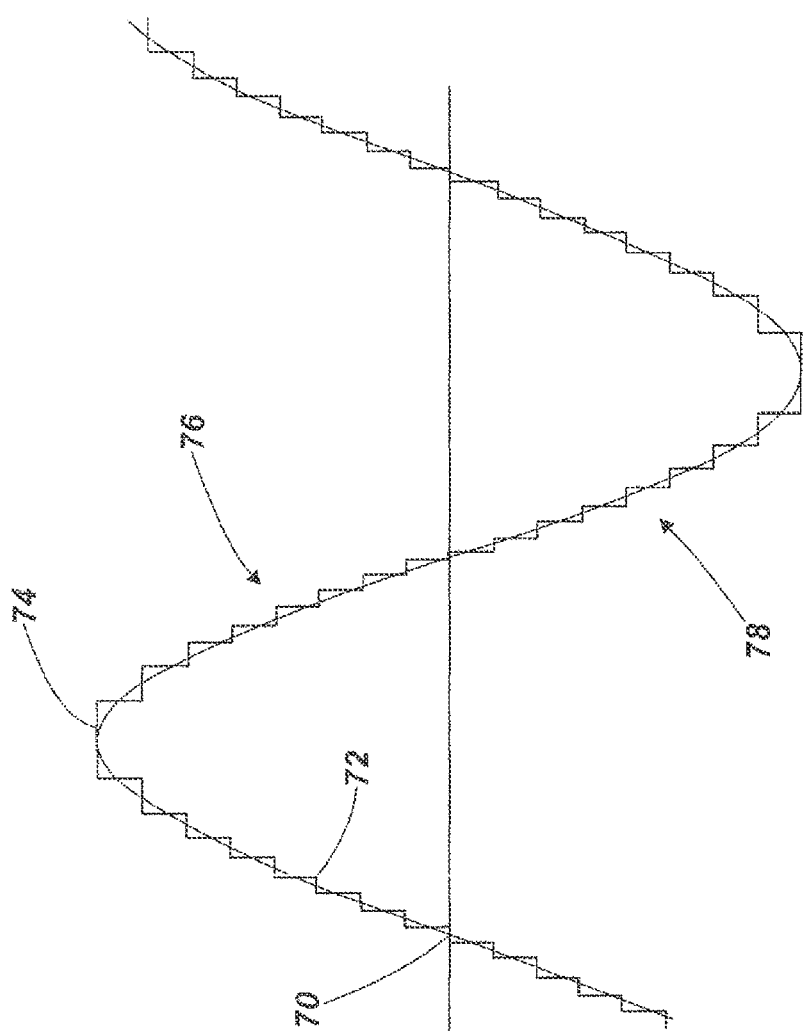

STATIC VAR COMPENSATOR WITH MULTILEVEL CONVERTER

CROSS REFERENCE TO RELATED APPLICATIONS OR PRIORITY CLAIM

This application is a National Phase of PCT/EP2010/053290, filed Mar. 15, 2010, entitled, "STATIC VAR COMPENSATOR WITH MULTILEVEL CONVERTER", the contents of which are incorporated herein by reference in their entirety.

The invention relates to a static synchronous compensator for use in reactive power compensation.

In high voltage direct current power transmission, alternating current (AC) electrical power is converted to high voltage direct current (DC) power for transmission via overhead lines and/or undersea cables. This conversion reduces the cost per kilometer of the lines and/or cables, and is therefore cost-effective when power needs to be transmitted over a long distance. Once the transmitted electrical power reaches its target destination, the high voltage DC electrical power is converted back to AC electrical power before being distributed to local networks.

Under different network conditions the transmission of electrical power through the AC transmission lines can experience fluctuations in voltage characteristics which may cause divergence from normal values. Such fluctuations can be minimised through the exchange of reactive power between a regulating device and the AC transmission lines. Such a regulating device is called a static synchronous compensator (STATCOM).

One form of known static synchronous compensator is shown in FIG. 1A and includes six sets of series connected insulated gate bipolar transistors (IGBTs) 20 and anti-parallel diodes 22. The IGBTs 20 are connected and switched together in series to enable high power ratings of 10's to 100's of MW to be realized.

This approach however required a complex and active IGBT drive, and may require large passive snubber components to ensure that the high voltage across the series strings of IGBTs 20 shares properly during switching. In addition the IGBTs 20 need to switch on and off several times at high voltage over each cycle of the AC supply frequency to control the harmonic currents being fed to the AC network 24. These factors lead to high losses, high levels of electromagnetic interference and a complex design.

Another known static synchronous compensator is shown in FIG. 1B and includes a multilevel arrangement. The multilevel arrangement includes converter bridges 26 of cells 28 connected in series, each converter cell 28 including a pair of series connected IGBTs 20 connected in parallel with a capacitor 30. Each converter cell 28 is switched at a different time and such an arrangement eliminates the problems associated with the direct switching of series connected IGBTs 20 because the individual converter cells 28 do not switch simultaneously and converter steps are comparatively small.

The capacitor 30 of each converter cell 28 must however have a high capacitive value to constrain the voltage variation at the capacitor terminals in the multilevel arrangement. Six DC side reactors 32 are also required to enable the parallel connection and operation of the converter limbs 34, and are primarily used to limit transient current flow between converter limbs 34.

These factors lead to expensive, large and heavy equipment with significant amounts of stored energy, making pre-assembly, testing and transportation of the equipment difficult.

According to an aspect of the invention there is provided a static synchronous compensator for use in reactive power compensation, the static synchronous compensator comprising at least one primary compensator limb including first and second DC terminals, and an AC terminal for connection in use to an AC network, the or each primary compensator limb defining first and second limb portions, each limb portion including at least one switching element connected in series with a chain-link converter between a respective one of the first and second DC terminals and the AC terminal, the switching elements of the first and second limb portions being operable to switch the respective chain-link converters in and out of circuit between the respective DC terminal and the AC terminal and the chain-link converters being operable to generate a voltage waveform at the AC terminal; and a secondary compensator limb including at least one DC link capacitor connected between the first and second DC terminals, the secondary compensator limb being connected in parallel with the or each primary compensator limb.

The provision of a secondary compensator limb allows the static synchronous compensator to exchange reactive power with the connected AC network in order to improve the stability and the voltage control of the AC network. This is done by using the DC link capacitor as a source to supply reactive power or a sink to absorb reactive power and by using the chain-link converter in each limb portion to provide fine control over the exchange of reactive power between the AC network and the DC link capacitor.

The series combination of one or more switching elements connected in series with a chain-link converter in each limb portion to switch the limb portion in and out of circuit between the respective DC terminal and the AC terminal is advantageous because it reduces the voltage range that each chain-link converter would be required to generate. This in turn allows the number of components in each chain-link converter to be minimized, and thereby results in savings in terms of size, weight and cost.

In embodiments of the invention, the secondary compensator limb may include two DC link capacitors connected in series, the junction between the DC link capacitors being connected in use to ground.

In other embodiments of the invention, the secondary compensator limb may include a DC link capacitor with a centre tap, the centre tap being connected in use to ground.

The provision of two DC link capacitors, or a DC link capacitor with a centre tap, in the secondary compensator limb provides an intermediate junction which may be connected to ground. Grounding this point provides a voltage reference for the static synchronous compensator and enables voltage stresses within equipment to be defined and controlled In other embodiments, another point in the equipment may be used to provide the ground reference.

Preferably each chain-link converter is operable when the respective limb portion is switched out of circuit to generate a voltage to offset the voltage across the limb portion and thereby minimize the voltage across the respective switching element.

This feature is advantageous in that it reduces the number of series connected devices required to implement the switching element, which minimises the hardware size, weight and costs.

Reducing the voltage across the switching element of each limb portion when the limb portion is switched out of circuit is also beneficial in that it minimizes the conduction and switching losses when the respective switching element toggles between open and closed positions.

Preferably the chain-link converter of each of the limb portions includes a chain of modules connected in series, each module including at least one pair of secondary switching elements connected in parallel with an energy storage device, the secondary switching elements being operable in use so that the chain of modules defines a stepped variable voltage source.

The use of a chain of modules connected in series allows each of the chain-link converters to provide a voltage that may be increased in incremental steps by the insertion of additional modules into the chain so as to provide a voltage that is higher than the voltage provided by each individual module. This arrangement therefore allows the voltage provided by the chain-link converter of each limb portion to be varied so as to allow the generation of a voltage waveform at the AC terminal.

In the event of a fault in the secondary compensator limb or the AC network connected to the static synchronous compensator, resulting in a high fault current in the static synchronous compensator, the secondary switching elements of the modules in the chain-link converter may be operated to insert modules into the chain so as to provide a voltage that opposes or matches the voltage of the AC network and thereby reduces the fault current in the static synchronous compensator.

In embodiments of the invention, the or each module of the chain-link converters may include two pairs of secondary switching elements connected in parallel with the respective energy storage device in a full-bridge arrangement to define a 4-quadrant bipolar module that can provide positive or negative voltage and can conduct current in both directions.

The ability of a 4-quadrant bipolar module to provide positive or negative voltages means that the voltage across each chain-link converter may be built up from a combination of modules providing positive or negative voltages. The energy levels in the individual energy storage devices may be maintained therefore at optimal levels by controlling the modules to alternate between providing positive or negative voltage.

The use of full-bridge modules in the chain-link converter of each limb portion also enables the chain-link converter to provide an output voltage at the AC terminal that exceeds the DC voltage of the DC network connected to the first and second DC terminals.

In other embodiments of the invention, the or each module of the chain-link converters may include one pair of secondary switching elements connected in parallel with the respective energy storage device in a half-bridge arrangement to define a 2-quadrant module that can provide positive or zero voltage and can conduct current in both directions.

The or each energy storage device may be any device that is capable of storing and releasing its electrical energy to provide a voltage and may therefore include a capacitor, a fuel cell, a battery or an auxiliary AC generator with an associated rectifier.

Such flexibility is useful in the design of converter stations in different locations where the availability of equipment may vary due to locality of transport difficulties. For example, the energy storage device of each module on offshore wind farms may be an auxiliary AC generator connected to the wind turbine.

The or each switching element of each limb portion preferably includes a semiconductor device, and may include an insulated gate bipolar transistor, a gate turn-off thyristor or an integrated gate-commutated thyristor.

Each chain-link converter also preferably includes at least one semiconductor device, and may include an insulated gate bipolar transistor, a gate turn-off thyristor or an integrated gate-commutated thyristor.

The use of semiconductor devices is advantageous because such devices are small in size and weight and have relatively low power dissipation, which minimizes the need for cooling equipment. It therefore leads to significant reductions in power converter cost, size and weight.

The fast switching characteristics of semiconductor devices allows the static synchronous compensator to respond quickly to changes in AC voltage characteristics of the AC network. The fast response of the static synchronous compensator minimises the risk of any fluctuations in AC voltage characteristics causing damage to power transmission equipment.

In embodiments of the invention the static synchronous compensator may include multiple primary compensator limbs, each limb including an AC terminal for connection to a respective phase of a multi-phase AC network.

In such static synchronous compensators, the series connection of the switching elements and chain-link converters of each converter limb operates independently of that of the other converter limbs and therefore only directly affects the phase connected to the respective AC terminal, and has limited influence on the phases connected to the AC terminals of the other converter limbs.

Preferably the chain-link converter of each limb portion is operable to generate a voltage to oppose the flow of current created by a fault, in use, in the secondary compensator limb or the AC network.

The chain-link modules may be switched into circuit to provide the opposing or matching voltage required to extinguish the fault current and thereby prevent damage to the static synchronous compensator components. Such use of the chain-link modules to carry out both voltage conversion and extinguishment of fault currents eliminates the need for the installation of separate protective circuit equipment to conduct and interrupt the fault current. This leads to savings in terms of hardware size, weight and costs.

The voltage rating of the chain-link converter and the voltage rating of the or each switching element, in each limb, may be equal. In other embodiments however the voltage rating of the chain-link converter and the voltage rating of the or each switching element, in each limb, may not be equal so as to optimise the converter cost, size, weight, efficiency and/or performance.

The switching elements in the first and second limb portions are preferably operable to switch the chain-link converters into circuit at the same time to reset any drift in voltages in the chain-link converter elements.

Preferred embodiments of the invention will now be described, by way of non-limiting examples, with reference to the accompanying drawings in which:

FIG. 6 shows the generation of a sinusoidal voltage waveform at the AC terminal of the static synchronous compensator shown in FIG. 2.

Figure 1B:
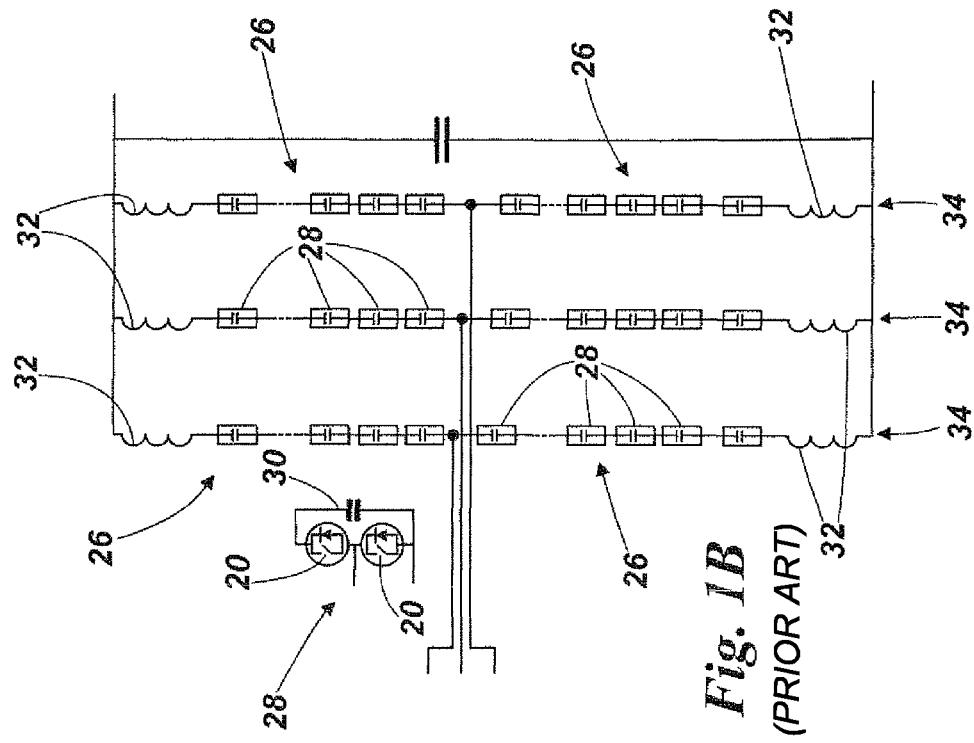
FIGS. 1a and 1b show, in schematic form, prior art static synchronous compensators for reactive power compensation.
Figure 1A:
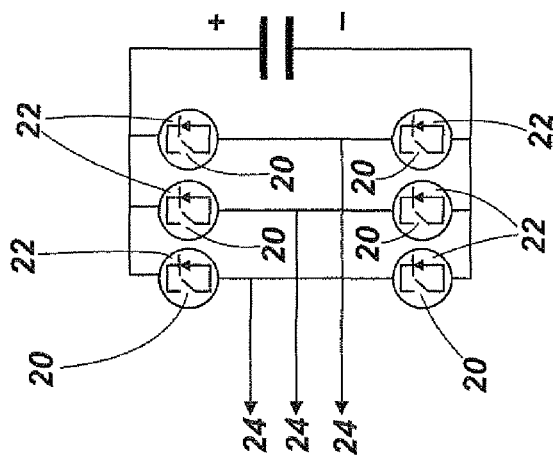
Figure 2:
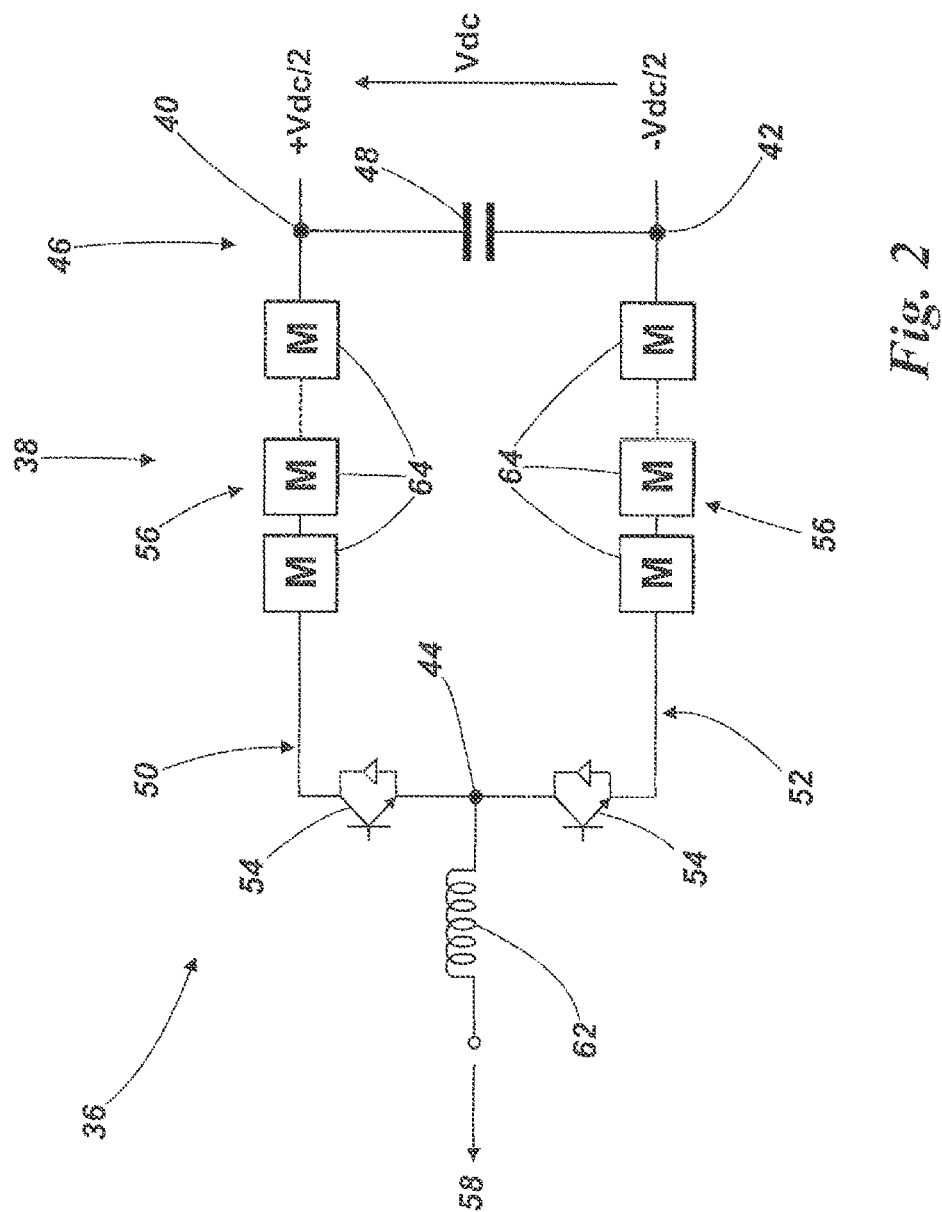
FIG. 2 shows a static synchronous compensator according to a first embodiment of the invention.

A static synchronous compensator 36 according to an embodiment of the invention is shown in FIG. 2.

The static synchronous compensator 36 includes a primary compensator limb 38 having first and second DC terminals 40,42 and an AC terminal 44, and a secondary compensator limb 46 including a DC link capacitor 48. The primary compensator limb 38 defines first and second limb portions 50,52, each limb portion 50,52 including a switching element 54 connected in series with a chain-link converter 56 between a respective one of the first and second DC terminals 40, 42 and the AC terminal 44.

In the embodiment shown in FIG. 2 the switching element 54 of each of the first and second limb portions 50,52 is connected to the AC terminal 44 and the chain-link converter 56 of each of the first and second limb portions 50, 52 is connected to the respective DC terminal 40, 42.

The series connection between the switching element 54 and the chain-link converter 56 of each of the first and second limb portions 50, 52 means that, in other embodiments, they may be connected in a reverse order between the AC terminal 44 and the respective DC terminal 40, 42.

The AC terminal 44 is connected in use to an AC network 58. In other embodiments the AC terminal 44 may be connected to the AC network 58 via one or more transformers and/or one or more inductors 62.

The secondary compensator limb 46 is connected between the first and second DC terminals 40, 42 so that the secondary compensator limb 46 is connected in parallel with the primary compensator limb 38. The first DC terminal 40 is connected to a positive terminal of the DC link capacitor 48 which in use carries a voltage of $+V_{DC}/2$, where $V_{DC}$ is the DC voltage range of the DC link capacitor 48. The second DC terminal 42 is connected to a negative terminal of the DC link capacitor 48 which in use carries a voltage of $-V_{DC}/2$.

When the static synchronous compensator 36 is connected to the AC network 58, the DC link capacitor 48 can function as a source to supply reactive power to the AC network 58 or as a sink to absorb reactive power from the AC network 58. The provision of such functions enables the static synchronous compensator 36 to regulate the AC voltage of the AC network 58.

Since the static synchronous compensator 36 is not connected to an external DC network at its DC side, the DC voltage is not restricted to a specific value and therefore can be varied. Variation of the DC voltage may be used to provide control over the reactive power exchange between the static synchronous compensator 36 and the AC network 58.

It is envisaged that the secondary compensator limb 46 includes two DC link capacitors 48 connected in series between the first and second DC terminals 40, 42, a connection to ground being provided at the junction between the DC link capacitors 48. The connection to ground ensures that there is zero net DC voltage across the transformer connected to the AC terminal 44. In other embodiments, it is envisaged that the connection to ground may be moved to a neutral (star) point of the transformer connected to the AC terminal 44.

Figure 3:
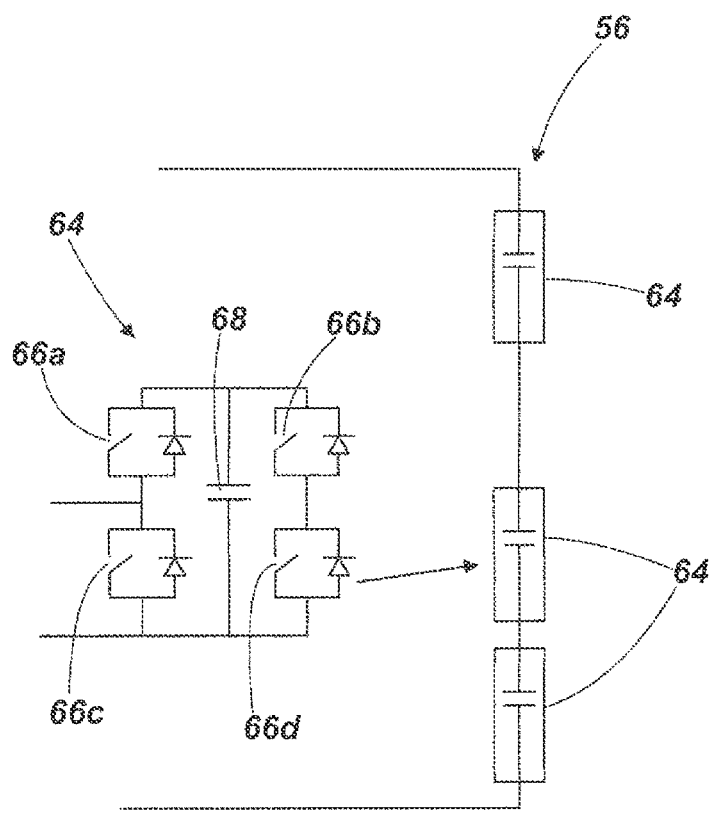
FIG. 3 shows the structure of a chain-link converter of the static synchronous compensator of FIG. 2.

Referring to FIG. 3, the chain-link converter 56 of each of the first and second limb portions includes a chain of modules 64 connected in series, each module 64 including two pairs of secondary switching elements 66a, 66b, 66c, 66d connected in parallel with a capacitor 68 in a full-bridge arrangement to form a 4-quadrant bipolar module 64 that can provide positive, zero or negative voltage, and can conduct current in both directions.

The secondary switching elements 66a, 66b, 66c, 66d are operable so that the chain of modules 64 provides a stepped variable voltage source, and are switched at the fundamental frequency of the AC network.

It is envisaged that in other embodiments, the capacitor 68 of each of the modules 64 may be replaced by a different energy storage device such as a fuel cell, a battery or an auxiliary AC generator with an associated rectifier.

The capacitor 68 of each module 64 may be bypassed or inserted into the respective chain-link converter 56 by changing the state of the secondary switching elements 66a, 66b, 66c, 66d.

A capacitor 68 of a module 64 is bypassed when a pair of secondary switching elements 66a, 66b, 66c, 66d is configured to form a short circuit in the module 64, causing the current in the static synchronous compensator to pass through the short circuit and bypass the capacitor.

A capacitor 68 of a module 64 is inserted into the chain-link converter 56 when the pair of secondary switching elements 66a, 66b, 66c, 66d is configured to allow the compensator current to flow into and out of the capacitor 68, which is then able to charge or to discharge its stored energy and provide a voltage.

It is therefore possible to build up a combined voltage across the chain-link converter 56 which is higher than the voltage available from each of the individual modules 64 via the insertion of the capacitors 68 of multiple modules 64, each providing its own voltage, into the chain-link converter 56.

Figure 4:
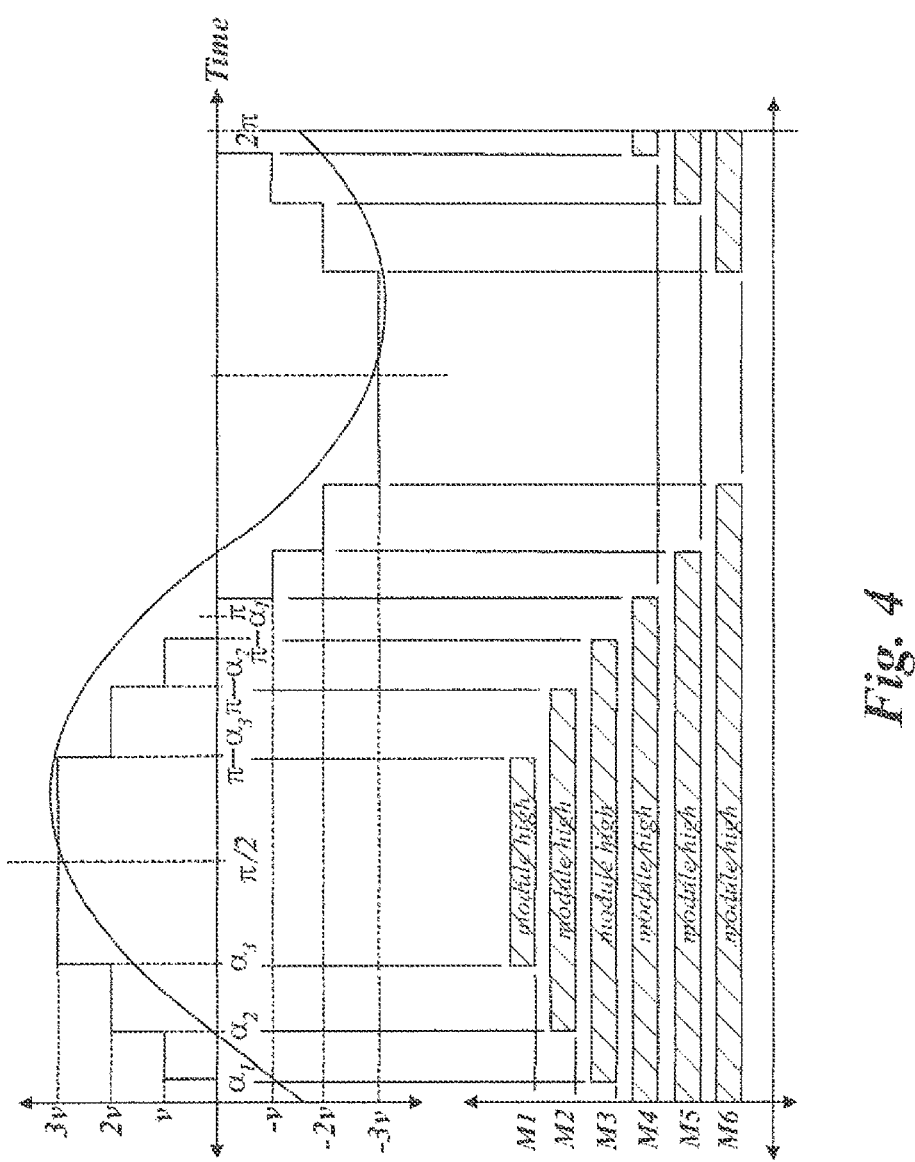
FIG. 4 shows the synthesis of a 50 Hz waveform using the chain-link converter shown in FIG. 3.

It is also possible to vary the timing of switching operations for each module 64 such that the insertion and/or bypass of the capacitors 68 of individual modules 64 in the chain-link converter 56 results in the generation of a voltage waveform. An example of a voltage waveform generated using the chain-link converter 56 is shown in FIG. 4, in which the insertion of the capacitors 68 of the individual modules 64 is staggered to generate a 50 Hz sinusoidal waveform. Other waveform shapes may be generated by adjusting the timing of switching operations for each module 64 in the chain-link converter 56.

In the embodiment shown in FIG. 3, each secondary switching element 66a, 66b, 66c, 66d includes an insulated gate bipolar transistor accompanied by a reverse-parallel connected diode.

In other embodiments it is envisaged that each secondary switching element 66a, 66b, 66c, 66d may include a different semiconductor switch, such as a gate turn-off thyristor or an integrated gate-commutated thyristor, accompanied by a reverse-parallel connected diode.

The fast switching characteristics of semiconductor devices allows the static synchronous compensator 36 to respond quickly to any change in the AC voltage of the AC network 58. The fast response of the static synchronous compensator 36 minimises the risk of any fluctuations in AC voltage characteristics causing damage to power transmission equipment.

Figure 5:
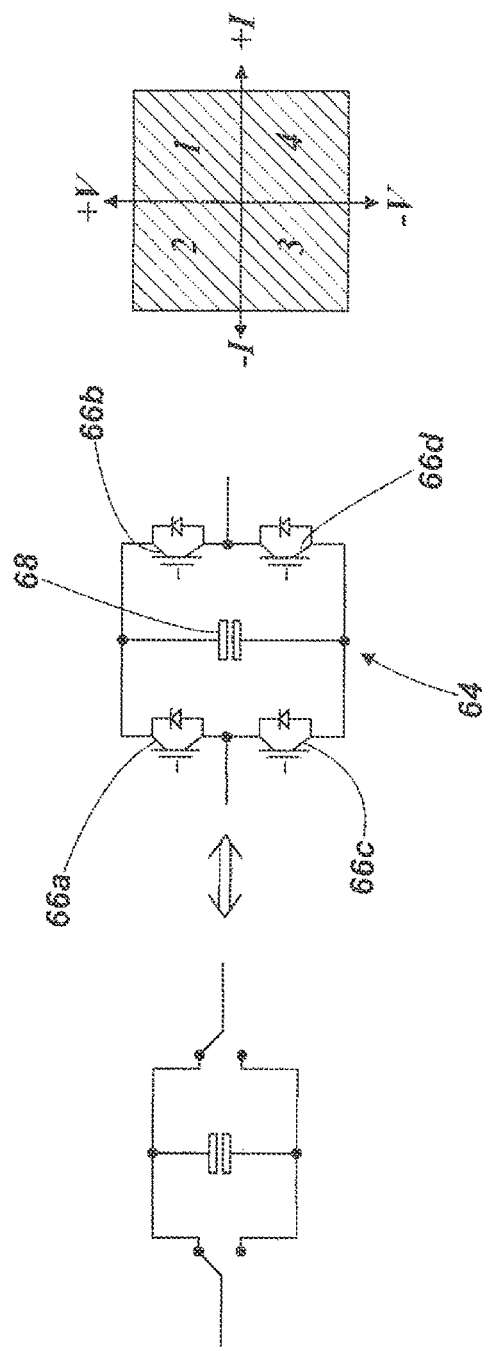
FIG. 5 shows a full-bridge module of the chain-link converter shown in FIG. 3.

The state of the secondary switching elements 66a, 66b, 66c, 66d (FIG. 5) of each module 64 determines the path of current through the module 64 and therefore the voltage provided by the module 64.

More specifically, the module 64 provides zero voltage when the capacitor is bypassed by either closing secondary switching element 66a, 66b, or closing secondary switching elements 66c, 66d.

The module 64 provides positive voltage for both directions of current flow when secondary switching elements 66a, 66d are closed and secondary switching elements 66b, 66c are open so that current flows via secondary switching elements 66a and 66d into and out of the capacitor.

The module 64 provides negative voltage for both directions of current flow when switches 66b and 66c are closed and switches 66a and 66d are open so that current flows via switches 66b and 66c into and out of the capacitor.

The number of modules 64 in each chain-link converter 56 is determined by the required voltage rating of the static synchronous compensator 36.

In use the switching elements 54 and the chain-link converters 56 of the first and second limb portions 50, 52 are operable to switch each of the chain-link converters 56 in and out of circuit between the respective DC terminal 40, 42 and the AC terminal 44. The chain-link converters 56 are operable to generate a voltage waveform at the AC terminal 44.

The chain-link converters 56 are preferably operable to generate a sinusoidal voltage waveform using a step-wise approximation. The chain-link converters 56 are suitable for use in step-wise waveform generation due to their ability to provide voltage steps to increase or decrease the output voltage at the AC terminal 44.

The ability of the chain-link converter 56 to generate different waveform shapes allows the static synchronous compensator 36 to cope with different changes in AC voltage characteristics arising from a variety of network conditions. Additionally the provision of a chain-link converter 56 allows the static synchronous compensator 36 to continuously exchange reactive power with the AC network 58 because the switching operations of the chain-link converter 56 may be varied to match the changing needs of the AC network 58 without any need for disconnection.

As previously described, the switching operations in the chain-link modules 64 may be configured so that the insertion and bypass of the capacitors 68 are staggered to form a step-wise approximation of a sinusoidal waveform, as shown in FIG. 4. The step-wise approximation of the voltage waveform may be improved by using a higher number of modules 64 with lower voltage levels to increase the number of voltage steps, as shown in FIG. 6. This may also be used to increase the precision of reactive power exchange between the static synchronous compensator 36 and the AC network 58 to provide a smooth profile of the respective AC phase voltage.

The switching element 54 of the first limb portion 50 is closed while the switching element 54 of the second limb portion 52 is open. The chain-link converter 56 in the first limb portion 50 is controlled to provide a voltage of $+V_{DC}/2$ so that it opposes the voltage at the positive terminal of the DC link capacitor 48. The output voltage at the AC terminal 44 is therefore zero volts i.e. halfway between the positive DC voltage at the positive terminal, $+V_{DC}/2$, and the negative DC voltage at the negative terminal, $-V_{DC}/2$. Any unused chain-link modules 64 are left in bypass mode.

In order to generate the positive voltage component 76 of the sinusoidal voltage waveform, the output voltage is slowly increased by reducing the number of inserted capacitors 68 of modules 64 in the chain-link converter 56 and thereby reducing the chain-link converter voltage. The change in the chain-link converter voltage can be observed in the step-wise increments of the output voltage at the AC terminal 44. At the peak of the positive voltage component 76, the chain-link converter 56 may be bypassed to produce a peak value 74 equal to the positive DC voltage, $+V_{DC/2}$, or it may produce a voltage that adds to the positive DC voltage of the DC link capacitor 48. The positive voltage component 76 produced may therefore have a peak 74 that is higher than the positive DC voltage of the DC link capacitor 48, if desired.

During the generation of the positive voltage component 76 of the sinusoidal voltage waveform, the voltage across the second limb portion 52 is equal to the difference between the output voltage and the negative DC voltage at the negative terminal, $-V_{DC}/2$ of the DC link capacitor 48.

The chain-link converter 56 of the first limb portion 50 is then controlled to reduce the output voltage in step-wise decrements by controlling the combined voltage across the chain-link converter 56 until the output voltage returns to zero 70.

When the output voltage returns to zero 70, the switching element 54 in the first limb portion 50 can remain closed when the switching element 54 of the second limb portion 52 is closed and before the switching element 54 in the first limb portion 50 is opened. This temporary over-lap period provides a method of connecting a number of modules 64 directly in parallel with the DC link capacitor 48 and provides a convenient method of resetting any drift in the capacitor voltage level.

The full voltage range of the DC link capacitor 48, $V_{DC}$, is opposed by the voltage provided by the chain-link converters 56 in both limb portions 50, 52 during the switching operations of both switching elements 54 from one state to the other.

The chain-link converter 56 in the first limb portion 50 is controlled to provide a voltage of $+V_{DC}/2$ while the chain-link converter 56 in the second limb portion 52 is controlled to provide a voltage of $-V_{DC}/2$. As a result, there is zero or minimal voltage across the switching elements 54 of the first and second limb portions 50, 52 when the switching elements 54 switch from one state to the other. The low voltage across the switching elements 54 of each of the limb portions 50, 52 leads to low switching losses.

The generation of the negative voltage component 78 of the sinusoidal waveform is similar to the generation of the positive voltage component 76 except that the switching element 54 of the first limb portion 50 remains open and the switching element 54 of the second limb portion 52 remains closed, and the generation of the voltage waveform is caused by the insertion and bypass of modules 64 in the chain-link converter 56 of the second limb portion 52.

During generation of the negative voltage component 78 of the sinusoidal voltage waveform, the voltage across the first limb portion 50 is equal to the difference between the output voltage and the positive DC voltage at the positive terminal, $+V_{DC}/2$ of the DC link capacitor 48.

When a switching element 54 in a limb portion is in the open state, the voltage rating of the switching element 54 is the difference between the peak output voltage at the AC terminal 44 and the maximum voltage capability of the chain-link converter 56 of the same limb portion. For example, when the peak output voltage is $+V_{DC}/2$, the voltage across the switching element 54 and the chain-link converter 56 of the second limb portion 52 is equal to $V_{DC}$, which is the difference between the peak output voltage and the negative DC voltage at the negative terminal of the DC link capacitor 48. The second limb portion 52 must therefore have a voltage capability that can support a voltage level of $V_{DC}$ of higher if the peak output voltage exceeds the DC voltage of the DC link capacitor 48.

The voltage capability of each limb portion 50, 52 is a combination of the voltage capability of the respective chain-link converter 56 and the voltage rating of the respective switching element 54 and can be distributed in a non-symmetrical manner if desired.

The voltage capability of each chain-link converter 56 is maximised by increasing the number of chain-link modules 64 or increasing the voltage of each of the individual capacitors and semiconductor switching elements 54. Consequently the required voltage rating of the switching element 54 may be reduced if the voltage capability of the chain-link converter 56 approaches $V_{DC}$. Reduction of voltage rating of the switching element 54 is advantageous in some applications because it allows the use of a switching element 54 that can withstand a voltage lower or much lower than the AC network 58 and/or the DC link capacitor 48.

It is also envisaged however that switching elements 54 with higher voltage ratings may be used in each limb portion 50, 52 so that the required voltage capability of the chain-link converter 56 in each limb portion 50, 52 can be reduced. This means that the number of modules 64 in each of the chain-link converters 56 may be decreased, which leads to considerable reduction in the size and weight of the static synchronous compensator 36.

In embodiments of the invention, the secondary switching elements 66a, 66b, 66c, 66d of the full-bridge module 64 may be configured to provide a voltage in the opposite direction so that the output voltage at the AC terminal 44 exceeds the voltage levels at the positive and negative terminals, of the DC link capacitor 48. This results in a greater power output for a given current rating of the static synchronous compensator 36.

The ability of the full-bridge module 64 to provide positive or negative voltage means that the voltage across each of the chain-link converters 56 may be built up from a combination of modules 64 providing positive or negative voltage instead of just positive voltage. The voltage levels in the individual capacitors 68 can therefore be maintained at optimal levels by controlling the modules 64 to alternate between providing positive voltage or negative voltage.

In the event of a fault in the secondary compensator limb 46 resulting in high fault current in the static synchronous compensator 36, the secondary switching elements 66a, 66b, 66c, 66d of each module 64 of one or other of the chain-link converters 56 may be operated to insert the full-bridge modules 64 to provide a voltage which opposes the driving voltage of the AC network 58 and thereby reduces the fault current in the static synchronous compensator 36.

For example, a short circuit occurring across the DC link capacitor 48 results in both voltages at the positive and negative terminals dropping to zero volts. When this happens, a high fault current can flow from the AC network 58 through the first limb portion 50 of the primary compensator limb 38, and return to the AC network 58 through the short circuit and the second limb portion 52 of an adjacent phase.

The low impedance of the short circuit means that the fault current flowing in the static synchronous compensator 36 may exceed the current rating of the static synchronous compensator 36.

The fault current may be minimised by opposing the driving voltage from the AC network 58. This is carried out by configuring the secondary switching elements 66a, 66b, 66c, 66d of each chain-link module 64 such that the modules 64 are inserted into the respective chain-link converter 56 to provide a voltage which opposes and thereby reduces the driving voltage.

In embodiments in which full-bridge modules 64 are used in each chain-link converter 56, each module 64 is capable of providing a voltage to oppose an AC driving voltage because the module 64 is able to provide positive or negative voltage, and is able to conduct current in both directions.

In the event of a fault in the AC network 58, the voltage of the AC network 58 may be reduced to a value lower than that of the output voltage of the static synchronous compensator 36. When this happens, a high fault current may flow from the converter into the fault in the AC network 58. The fault current may be minimised by configuring the secondary switching elements 66a, 66b, 66c, 66d of each chain-link module 64 such that the modules 64 are inserted into the respective chain-link converter 56 to provide a voltage which matches the present voltage of the AC network 58 and thereby prevent current flow between the static synchronous compensator 36 and the AC network 58.

The static synchronous compensator 36 shown in FIG. 2 is suitable for connection to one phase of a multiphase AC network 58.

Figure 7A:
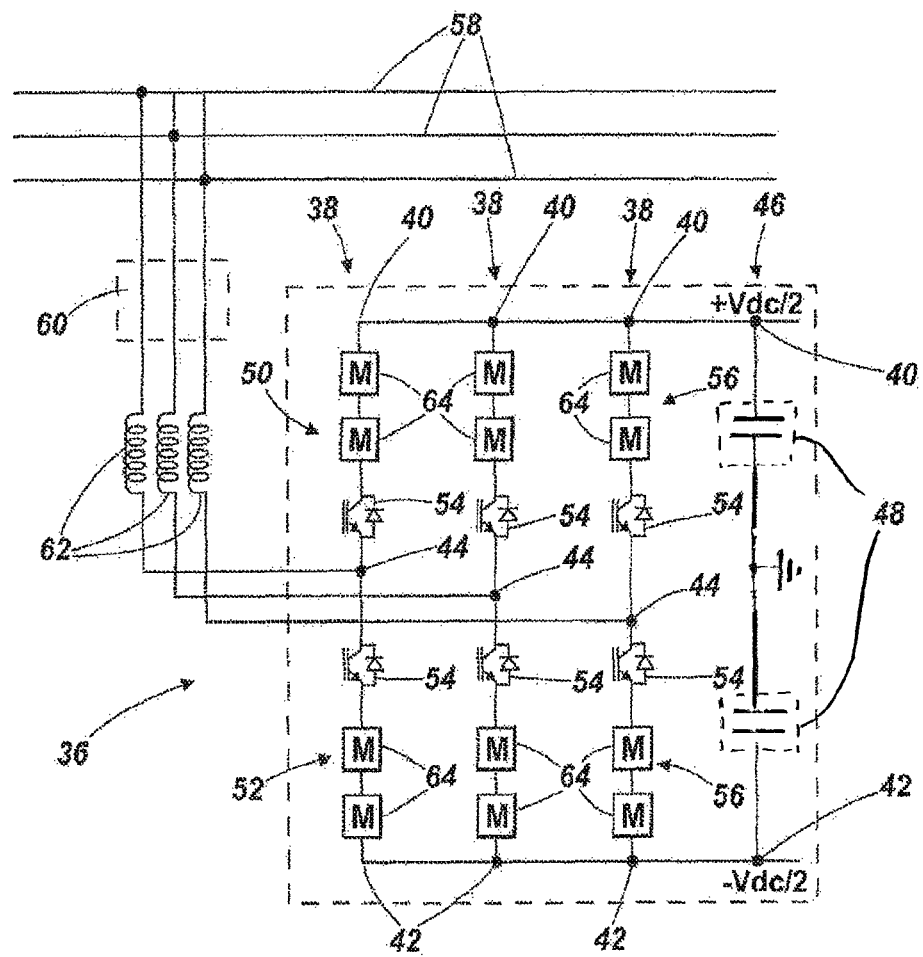
FIGS. 7A and 7B show a static synchronous compensator according to a second embodiment of the invention.
Figure 7B:
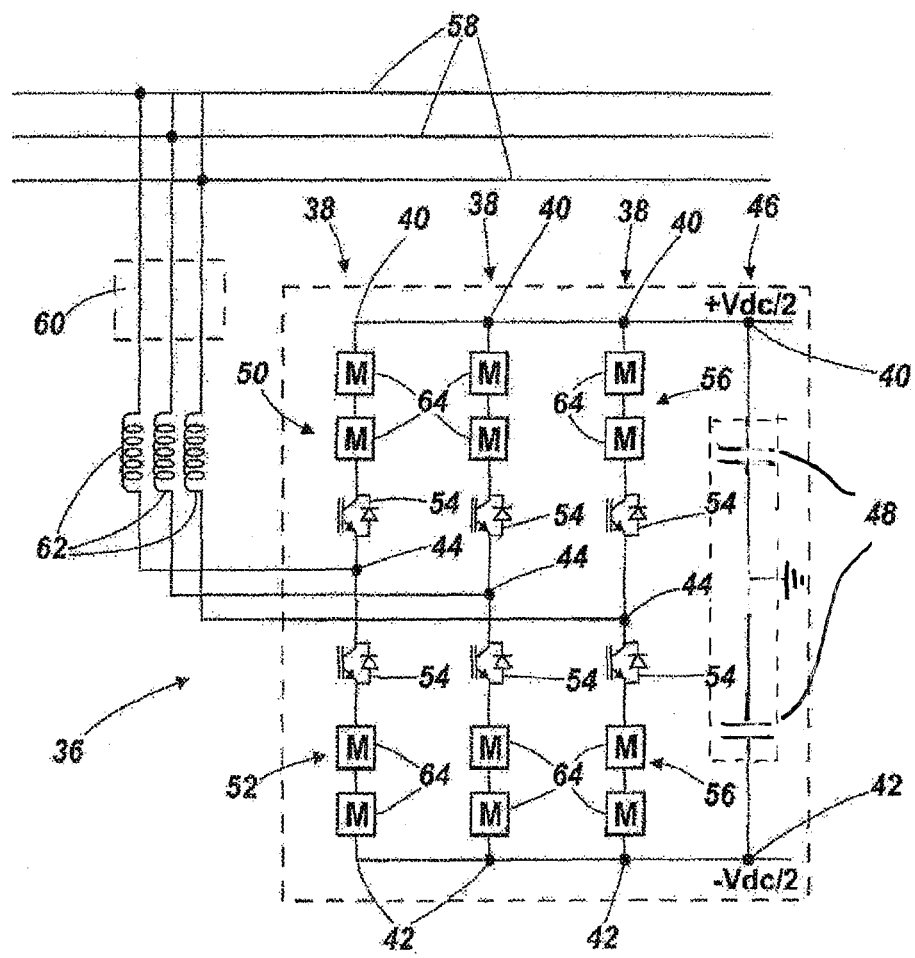

In other embodiments, such as that shown in FIGS. 7A and 7B, the static synchronous compensator 36 may include multiple primary compensator limbs 38, each primary compensator limb 38 including an AC terminal 44 for connection to an individual phase of a multiphase AC network 58. In such embodiments, the number of primary compensator limbs 38 provided is dependent on the number of phases of the AC network 58.

The static synchronous compensator 36 shown in FIGS. 7A and 7B include three primary compensator limbs 38 so as to permit use of the static synchronous compensator 36 with a three-phase AC network 58.

Each primary compensator limb 38 includes first and second DC terminals 40, 42 and an AC terminal 44. Each primary compensator limb 38 also defines first and second limb portions 50, 52, each limb portion 50, 52 including a switching element 54 connected in series with a chain-link converter 56 between a respective one of the first and second DC terminals 40, 42 and the AC terminal 44.

The switching element 54 of each of the first and second limb portions 50, 52 is connected to the respective AC terminal 44 and the chain-link converter 56 of each of the first and second limb portions 50, 52 is connected to the respective first and second DC terminals 40, 42.

The series connection between the switching element 54 and the chain-link converter 56 of each of the first and second limb portions 50, 52 means that, in other embodiments, they may be connected in a reverse order between the AC terminal 44 and the respective DC terminal 40, 42.

Each AC terminal 44 is connected in use to a respective phase of the three-phase AC network 58. In other embodiments each AC terminal 44 may be connected to a respective phase of the three-phase AC network 58 via one or more transformers 60 and/or one or more inductors 62.

The secondary compensator limb 46 is connected between the first and second DC terminals 40, 42 so that the secondary compensator limb 46 is connected in parallel with the primary compensator limb 38. Each first DC terminal 40 is connected to a positive terminal of the DC link capacitor 48 which carries a voltage of $+V_{DC}/2$, where $V_{DC}$ is the DC voltage range of the DC link capacitor 48. Each second DC terminal 42 is connected to a negative terminal of the DC link capacitor 48 which carries a voltage of $-V_{DC}/2$.

The switching elements 54 of the first and second limb portions 50, 52 of each primary compensator limb 38 are operable in use to switch the respective chain-link converters 56 in and out of circuit between the respective DC terminal 40, 42 and the AC terminal 44. The chain-link converters 56 of each primary compensator limb 38 are operable to generate a voltage waveform at the respective AC terminal 44 so that a three-phase voltage waveform is generated.

Control of the three-phase static synchronous compensator 36 is similar to the above-described control of the single-phase static synchronous compensator 36 since operation of the series combination of the switching element 54 and the chain-link converter 56 in a primary compensator limb 38 only directly affects the phase connected to that primary compensator limb 38, and has limited influence on the phases connected to the other primary compensator limbs 38.

The invention claimed is:

1. A static synchronous compensator for use in reactive power compensation, the static synchronous compensator comprising at least one primary compensator limb including first and second DC terminals, and an AC terminal for connection in use to an AC network, the or each primary compensator limb defining first and second limb portions, each limb portion including at least one switching element and a chain-link converter connected in series at a common point, said common point being shared only by the switching element and the chain-link converter, the switching element and the chain-link converter being mounted between a respective one of the first and second DC terminals and the AC terminal, wherein the switching elements of the first and second limb portions being operable to switch the respective chain-link converters in and out of circuit between the respective DC terminal and the AC terminal, wherein the switching elements of the first and second limb portions being operable to switch the chain-link converters into circuit at the same time and wherein the chain-link converters being operable to generate a voltage waveform at the AC terminal; and a secondary compensator limb including at least one DC link capacitor connected between the first and second DC terminals, the secondary compensator limb being connected in parallel with the or each primary compensator limb.

2. The static synchronous compensator according to claim 1 wherein the secondary compensator limb includes two DC link capacitors connected in series, a junction between the DC link capacitors being connected in use to ground.

3. The static synchronous compensator according to claim 1 wherein the secondary compensator limb includes a DC link capacitor with a center tap, the center tap being connected in use to ground.

4. The static synchronous compensator according to claim 1 wherein each chain-link converter is operable when the respective limb portion is switched out of circuit to generate a voltage to offset a voltage across the limb portion and thereby minimize the voltage across the respective switching element.

5. The static synchronous compensator according to claim 1 wherein the chain-link converter of each of the limb portions includes a chain of modules connected in series, each module including at least one pair of secondary switching elements connected in parallel with an energy storage device, the secondary switching elements being operable in use so that the chain of modules defines a stepped variable voltage source.

6. The static synchronous compensator according to claim 5 wherein the or each module of the chain-link converters includes two pairs of secondary switching elements connected in parallel with the respective energy storage device in a full-bridge arrangement to define a 4-quadrant bipolar module that can provide positive or negative voltage and can conduct current in both directions.

7. The static synchronous compensator according to claim 5 wherein the or each module of the chain-link converters includes a pair of secondary switching elements connected in parallel with the respective energy storage device in a half-bridge arrangement to define a 2-quadrant module that can provide positive or zero voltage and can conduct current in both directions.

8. The static synchronous compensator according to claim 5 wherein the or each energy storage device includes a capacitor, a fuel cell, a battery or an auxiliary AC generator with an associated rectifier.

9. The static synchronous compensator according to claim 1 wherein the or each switching element of each limb portion includes a semiconductor device.

10. The static synchronous compensator according to claim 9 wherein the or each semiconductor device includes an insulated gate bipolar transistor, a gate turn-off thyristor or an integrated gate-commutated thyristor.

11. The static synchronous compensator according to claim 1 wherein the chain-link converter of each limb portion includes at least one semiconductor device.

12. The static synchronous compensator according to claim 1 including multiple primary compensator limbs, each primary compensator limb including an AC terminal for connection in use to a respective phase of a multi-phase AC network.

13. The static synchronous compensator according to claim 1 wherein the chain-link converter of each limb portion is operable to generate a voltage to oppose the flow of current created by a fault, in use, in the secondary compensator limb or the AC network.

14. The static synchronous compensator according to claim 1 wherein, in each limb portion, a voltage rating of the chain-link converter and a voltage rating of the or each switching element are equal.

15. The static synchronous compensator according to claim 1 wherein, in each limb portion, a voltage rating of the chain-link converter and a voltage rating of the or each switching element are not equal.

16. The static synchronous compensator according to claim 1 wherein the switching elements in the first and second limb portions are operable to switch the chain-link converters into circuit at the same time to reset any drift in voltages in the chain-link converter elements.

* * * * *